United States Patent [19]

Mamada et al.

[11] Patent Number: 4,836,257
[45] Date of Patent: Jun. 6, 1989

[54] PNEUMATIC RADIAL TIRE TREAD FOR REDUCING WANDERING

[75] Inventors: Mamoru Mamada, Tokyo; Mitsuhisa Yahagi, Saitama; Masao Nakamura, Tokyo, all of Japan

[73] Assignee: Bridgestone Corporation, Tokyo, Japan

[21] Appl. No.: 46,617

[22] Filed: May 7, 1987

[30] Foreign Application Priority Data

May 8, 1986 [JP] Japan ................... 61-105583

[51] Int. Cl.$^4$ .................. B60C 11/06; B60C 11/12
[52] U.S. Cl. ........................ 152/209 R; 152/DIG. 3
[58] Field of Search ......... 152/209 R, 209 D, DIG. 3

[56] References Cited

U.S. PATENT DOCUMENTS

| | | | |
|---|---|---|---|
| 3,411,559 | 11/1968 | Verdier et al. | 152/209 |
| 4,258,769 | 3/1981 | Makino et al. | 152/209 P |
| 4,262,722 | 4/1981 | Takigawa et al. | 152/209 |
| 4,282,914 | 8/1981 | Takigawa et al. | 152/209 |
| 4,298,046 | 11/1981 | Herbelleau | 152/209 R |
| 4,461,334 | 7/1984 | Tansei et al. | 152/209 P |
| 4,480,671 | 11/1984 | Giron | 152/209 |
| 4,546,808 | 10/1985 | Fontaine | 152/209 R |

FOREIGN PATENT DOCUMENTS 55-44028  3/1980  Japan .
57-41202  8/1982  Japan .
819553  9/1959  United Kingdom .
2036663  7/1980  United Kingdom ............ 152/209 D Primary Examiner—David A. Simmons
Assistant Examiner—Geoffrey L. Knable
Attorney, Agent, or Firm—Sughrue, Mion, Zinn, Macpeak, and Seas

[57] ABSTRACT

In order to improve the wandering performance of a radial tire, that is, to increase the camber thrust, the camber torque and the self-alignment effort of the tire without degrading various performances required for the radial tire, the radial tire is formed with a plurality of main zigzag wide grooves extending in the circumferential direction of the tire; at least one auxiliary straight narrow groove disposed on the shoulder rib and extending in a circumferential direction of the tire; and a plurality of sipes arranged outside the auxiliary groove at regular intervals along the outermost circumferential edge of the tire and extending in the lateral direction of the tire from the outermost end of the tire to the auxiliary groove. The width $W_a$ of the auxiliary groove is 1 to 4% of that of the main grooves $W_m$; the outward inclination angle $\theta_a$ is 10 to 60 degrees with respect to a normal line perpendicular to the tread outer surface; the position of the auxiliary groove is such that a distance $S_a$ from an outermost edge of the tread thereto is 20 to 80% of a distance $S_m$ from the same outermost edge to the main grooves.

15 Claims, 6 Drawing Sheets

PNEUMATIC RADIAL TIRE TREAD FOR REDUCING WANDERING

BACKGROUND OF THE INVENTION

1. Field of the Invention

The present invention relates generally to a pneumatic radial tire adopted to be used for heavy-duty load vehicles such as trucks, buses, etc. and more specifically to an improvement in wandering performance without degrading various other performances required for the tire.

2. Description of the Prior Art

As an undesired phenomenon produced in heavy-duty radial tires, "wandering" in particular, has been pointed out as a problem to be solved. This wandering phenomenon is: When a heavy-duty load vehicle such as trucks or buses travels along rut (wheel track or mark) formed on a busy paved road surface by wear or sinking due to vehicle weight, the driver loses control of the vehicle and therefore has difficulty in steering the vehicle when keeping the vehicle traveling straight along the slope of a rut or changing the travel line across a rut.

In general, when heavy-duty pneumatic tires travel on a road on which ruts are formed, the bias-structure tires are relatively well controllable by the driver, while the radial-structure tires are usually not considered as being controllable by the drivers. In more detail, when the radial tire comes on the top of a rut in changing the travel lane, a lateral force is immediately produced in such a way that the tire is pulled down to the bottom of the rut; as a result, the radial tire tends to run on the top of another adjacent rut or further beyond the top thereof, being subjected to a strong impulsive reactive force. Further, when the radial front tire travels on and along the slope of a rut, it is possible to keep tire travelling parallel to the slope thereof, only when the driver holds the steering wheel with a strong self-alignment effort. Therefore, there exists a strong demand for heavy-duty vehicle radial tires excellent in wandering prevention performance from both the manufacturers and the users.

SUMMARY OF THE INVENTION

With these problems in mind, therefore, it is the primary object of the present to provide a heavy-duty vehicle pneumatic radial tire formed with an improved tread pattern to markedly improve the wandering prevention performance without degrading other characteristics required for the tires.

To achieve the above-mentioned object, the pneumatic radial tire according to the present invention comprises:

(a) a plurality of main grooves extending in a substantially circumferential direction of the radial tire;

(b) at least one auxiliary groove disposed at least one side of a shoulder rib of the radial tire and extending in a substantially circumferential direction of the radial tire in such a way that a width of said auxiliary groove is narrower than that of said main groove but wide enough not to bring both side walls of said auxiliary groove into contact with each other during cruising of the vehicle upon load; and an outward inclination angle of said auxiliary groove is 10 to 60 degrees with respect to a normal line substantially perpendicular to an outer surface of a tire tread; and a position of said auxiliary groove is such that a distance from an outermost edge of the tread to the auxiliary groove is 20 to 80% of a distance from the same outermost edge of the tread to the main grooves; and (c) a plurality of sipes arranged outside said auxiliary groove at regular intervals along the circumferential direction of the tread and extending substantially in the lateral direction of the tread from the outermost edge of the tread to said auxiliary groove.

Preferably, the width of said auxiliary groove is 1 to 4% of that of said main groove or 2 to 6 mm. The depth of said auxiliary groove is 30 to 120% of that of said main groove. The width of said sipes is 0.3 to 1.5 mm. The depth of said sipes is 30 to 80% of that of said auxiliary groove. The positional intervals of said sipes are 3 to 12 mm. The sipes are preferably inclined toward a direction that the tire is rotating at an angle 0 to 60 degrees with respect to the tire radial direction. The corner of the tire is square, round ($r = 10$ to 50 mm), or tapered ($T = 30$ to 60 degrees) in shape.

The auxiliary groove having the above-mentioned width, depth, inclination angle, arrangement position, etc. increases the camber thrust of the tire, and additionally the sipes having the above-mentioned width, depth intervals, etc. increase the camber torque of the tire, so that the tire wandering performance can be improved markedly.

The above-mentioned gist of the present invention is based upon the causal relation between the wandering producing mechanism and the prevention means, which has been studied by an inventors' devoted effort as follows:

When a tire is travelling along a slope of a rut, the tire is in a state equivalent to that where a camber is applied to the tire. In this state, a braking force $F_B$ is generated on the tread surface in a rotating tire on the rut top side; a driving force $F_D$ is generated in the direction opposite to that of $F_B$ on the rut bottom side; and therefore a camber torque $T_C$ or a moment to urge the tire toward the rut top is generated as shown in FIGS. 12a and 12b. Further, the camber torque of the bias tire is several times greater than that of the radial tire, so that the bias tire can be maintained in a required travel condition under a relatively small self-alignment effort and therefore excellent in steering characteristics.

On the basis of the above-mentioned fact, the inventors have studied of means for generating a camber torque equivalent to that of a bias tire when a radial tire is travelling along a rut slope without deteriorating various other preferable characteristics of radial tires. As a result, the inventors have found that it is also effective to increase the wandering performance by generating a camber thrust due to contact of the rotating tire (under road) with the road surface.

In more detail, as shown in FIG. 13, it is possible to generate a shearing force $F_1$ by bringing the shoulder rib end into contact with the load surface (in FIG. 13 a block load is placed on the tread) to accelerate tire deformation (crushing).

This shear force $F_1$ toward the tread end is generated because when the tire rotates along a slope surface, the contact pressure between tire and ground on the shoulder ribs is higher at the shoulder rib $S_u$ in contact with the upper slope surface than at the shoulder rib $S_l$ in contact with the lower slope surface, and therefore the tire deforms greatly on the upper slope surface, so that a camber thrust for urging the tire upward along the slope is generated synthetically.

On the basis of the above fact, the inventors have studied means for generating a tire camber thrust in addition to a tire camber torque when the tire rotates along a slope surface.

The gist of the present invention has been thus obtained, whereby a braking force against a tire rotation on the tread surface can be increased; the camber torque can be increased; and further the camber thrust can be increased due to the deformation (crushing) of tire on the shoulder rib side.

BRIEF DESCRIPTION OF THE DRAWINGS

The features and advantages of the pneumatic radial tire according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

Figure 1:
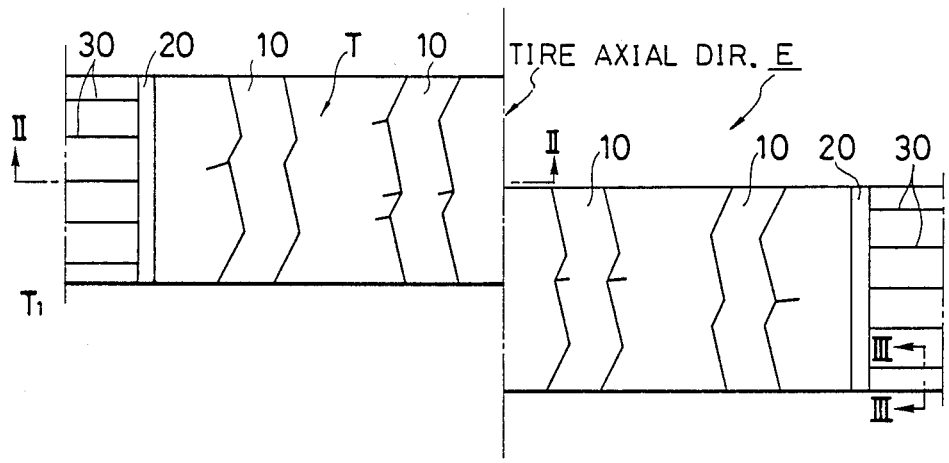
FIG. 1 is a development elevational view showing an essential portion of a pneumatic radial tire for heavy-duty load vehicle constructed in accordance with the present invention.

With reference to the attached drawings, the pneumatic radial tire according to the present invention will be described hereinbelow in detail.

In FIGS. 1 to 6, a tire tread T of the pneumatic radial tire E for heavy-duty road vehicles is provided with a plurality of main wide zigzag grooves 10 extending in the substantially circumferential direction of the tire, an auxiliary narrow straight groove 20 arranged on at least one side shoulder rib $T_s$ and extending in the substantially circumferential direction of the tire, and a plurality of sipes 30 arranged on a land portion P located outside the auxiliary groove 20 at regular intervals along the circumferential direction of the tire E and extending in the substantially lateral direction of the tire from the outermost end of the tire to the auxiliary narrow groove so as to traverse the land portion P.

Here, the sipes 30 are intended to mean narrow incisions substantially closed in the ground-contact region of the tread during running of the vehicle under load. Each of the sipes 30 extends in the lateral direction of the tire from the outermost end thereof for the purpose of generating the braking force and decreasing sufficiently the ridigity of the laterally outermost end.

In the radial tire according to the present invention, the width $W_a$ of the auxiliary straight groove 20 is such as to be narrower than the width $W_m$ of the circumferentially extending main groove 10 adjacent thereto but wide enough to such an extent that both side walls 22, 21 of the auxiliary groove 20 are not brought into contact with each other when the tire is rotating. Further, an outward inclination angle $\theta_a$ of the auxiliary groove 20 with respect to a normal line $N_T$ substantially vertical to the outer surface of the tread T lies between 10 and 60 degrees. Furthermore, the auxiliary grooves 20 are formed at such a position that a distance $S_a$, measured in the lateral direction of the tire, from a lateral edge of the tread to the auxiliary groove end is 20 to 80% of a width $S_m$ from the lateral edge of the tread to the main groove end (i.e. a width $S_m$ of the shoulder rib $S_r$ or the land portion P in FIG. 2).

The dimensional features of the radial tire according to the present invention will be described hereinbelow in more detail in relation to the camber thrust, the camber torque, and the self-alignment effort of the tire with reference to the attached graphical representations.

Figure 8:
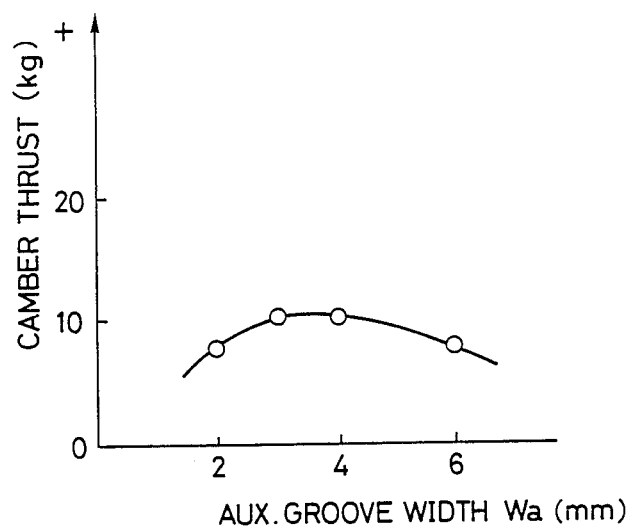
FIG. 8 is a graphical representation showing the relationship between the auxiliary groove width and the camber thrust.

It is preferable that the groove width $W_a$ of the auxiliary groove 20 is determined within a range of 2 to 6 mm when measured in the lateral direction of the tire substantially in parallel to the axis of rotation of the tire. FIG. 8 shows the relationship between the auxiliary groove width $W_a$ (mm) and the camber thrust (kg). This graph indicates the following facts: When the auxiliary groove width $W_a$ is less than 2 mm, the width $W_a$ is too narrow, so that both the side walls 21 thereof are brought into contact with each other when the tire is rotating and therefore the camber thrust (kg) closely related to the wandering performance decreases markedly. On the other hand, when the auxiliary groove width $W_a$ is more than 6 mm, the width $W_a$ is too wide so that the camber thrust (kg) also decreases.

Figure 9:
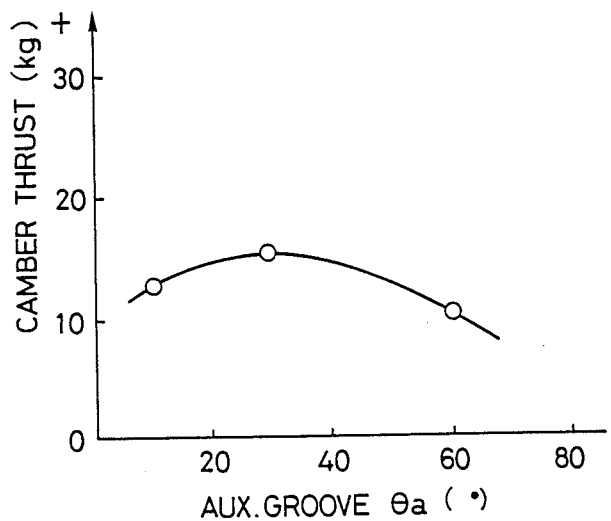
FIG. 9 is a graphical representation showing the relationship between the auxiliary groove indication angle and the camber thrust.

Further, it is preferable that the outward inclination angle $\theta_a$ of the auxiliary groove 20 with respect to a normal line $N_T$ substantially vertical to the outer surface of the tread T is determined withing a range of 10 to 60 degrees. FIG. 9 shows the relationship between the inclination angle $\theta_a$ (degrees) and the camber thrust (kg). This graph indicates the following facts: When the inclination angle $\theta_a$ is less than 10 degrees, the angle is too small, so that the camber thrust (kg) closely related to the wandering performance decreases markedly. On the other hand, when the inclination angle $\theta_a$ is more than 60 degrees, the angle is too large, so that the camber thrust (kg) also decreases.

Figure 10:
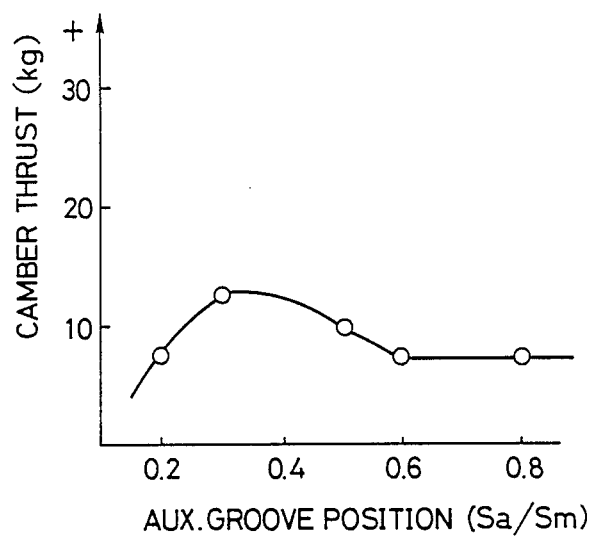
FIG. 10 is a graphical representation showing the relationship between the auxiliary groove arrangement position and the camber thrust.

Further, it is necessary to determine the position of the auxiliary groove 20 within a range of 0.2 to 0.8 in $S_a/S_m$ where $S_a$ denotes a distance from the tread end $T_e$ to the auxiliary groove 20 and $S_m$ denotes a shoulder rib width. FIG. 10 shows the relationship between the auxiliary groove position $S_a/S_m$ and the camber thrust. This graph indicates the following facts: When the auxiliary groove position ($S_a/S_m$) is less than 0.2, since the auxiliary groove is too close to the tread end $T_e$, it is impossible to increase the camber thrust which is one of the factors for improving the wandering performance. On the other hand, when the $S_a/S_m$ is more than 0.8, since the auxiliary groove is too close to the adjacent main circumferential groove 10, so that the camber thrust also decreases.

Figure 11:
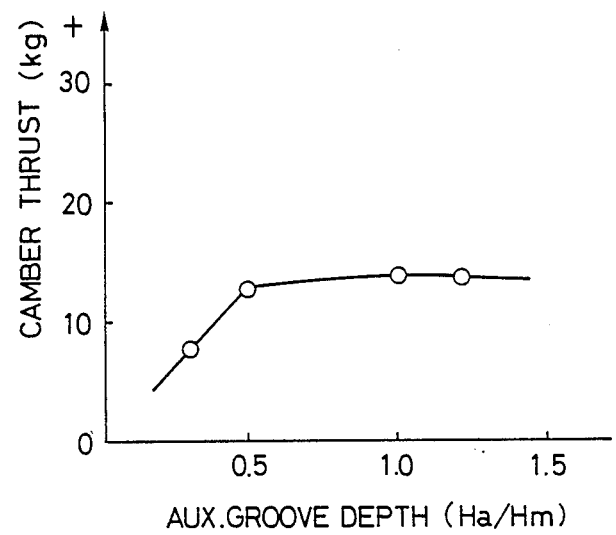
FIG. 11 is a graphical representation showing the relationship between the auxiliary groove depth and the camber thrust.
Figure 12A:
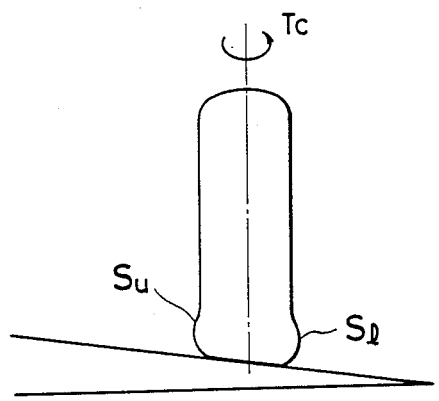
FIGS. 12 (a) and (b) are illustrations for assistance in explaining tire camber torque.
Figure 12B:
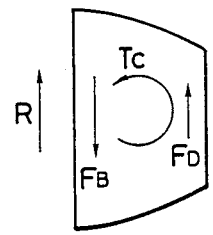
Figure 13:
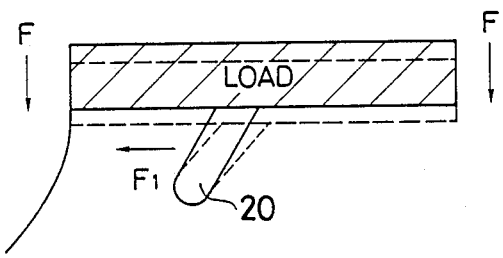
FIG. 13 is an illustration for assistance in explaining tire camber thrust, which shows the deformation of a groove when a load is applied onto the tread thereof so that a shearing force is produced.

Furthermore, it is preferable that the groove depth $H_a$ of the auxiliary groove 20 is determined within a range of 30% to 120% of the groove depth $H_m$ of the adjacent main groove 10. FIG. 11 shows the relationship between the ratio ($H_a/H_m$) of the auxiliary groove depth $H_a$ to the main groove depth $H_m$ and the camber thrust. This graph indicates the following facts: When the ratio ($H_a/H_m$) of the auxiliary groove depth $H_a$ to the main groove depth $H_m$ is less than 30%, the groove depth $H_a$ is too shallow, so that the camber thrust (kg) decreases markedly. On the other hand, when the ratio ($H_a/H_m$) is more than 120%, the groove depth $H_a$ is too deep, so that the groove bottom of the auxiliary groove 20 may reach the belt layers of the tire and therefore the rib tear resistance will be reduced.

In addition, although being different according to the tire size, it is preferable that the width $W_s$ (see FIG. 3) of the sipes 30 is determined within a range of 0.3 to 1.5 mm and the depth $H_s$ of the sipes 30 is determined within a range of 30 to 80% of the groove depth $H_a$ of the auxiliary groove 20. Further, the sipes 30 are arranged along an outer circumference of the tire preferably at regular intervals of 3 to 12 mm although being different according to the tire size.

Figure 2:
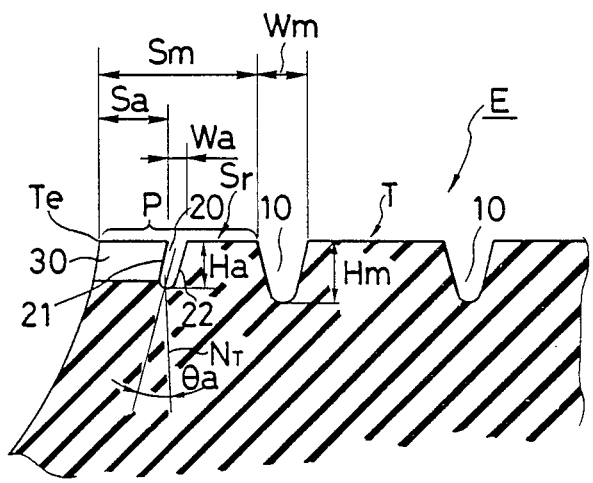
FIG. 2 is a fragmentary cross-sectional view showing the tread of tire taken substantially along line II—II shown in FIG. 1.
Figure 3:
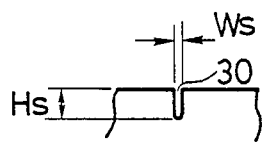
FIG. 3 is a fragmentary cross-sectional view showing a sipe taken substantially along line III—III shown in FIG. 1.

In FIG. 1 to 3, the sipes 30 are formed in such a way that the open ends thereof extend from the outermost end of the tire toward the lateral direction of the tire (in the direction substantially parallel to the axial direction of the tire) so as to traverse the land portion P of the tire at regular intervals along the outermost circumference of the tire and further the bottom ends thereof extends radially toward the axial direction of the tire E.

Figure 4:
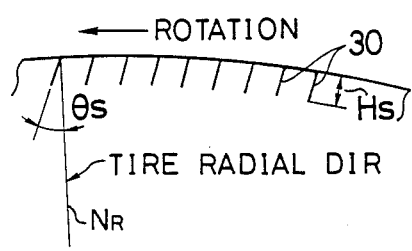
FIG. 4 is a fragmentary side view of the tire showing sipes inclined toward the tire rotating direction at an angle with respect to the tire radial direction.

Without being limited thereto, however, it is possible to form the sipes 30 in such a way that the bottom ends thereof extend toward the direction that the tire is rotating at inclination angle $\theta_s$ with respect to the radial direction $N_R$ of the tire, as depicted in FIG. 4. In this case, it is preferable that the inclination angle $\theta_s$ is determined within a range of 0 to 60 degrees. In FIGS. 4, the arrow indicates the rotating direction of the tire. However, sipes formed in such a way that the bottom ends thereof extends toward the direction opposite to the tire rotating direction are not effective, because the braking force and the camber torque both decrease and therefore the wandering performance cannot be improved.

Figure 5:
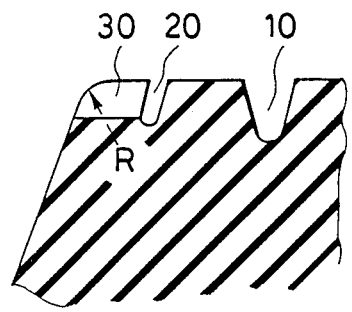
FIG. 5 is a fragmentary cross-sectional view showing the tire having round shoulders at both the trend ends thereof when viewed in a cross section taken along a lateral direction of the tire.
Figure 6:
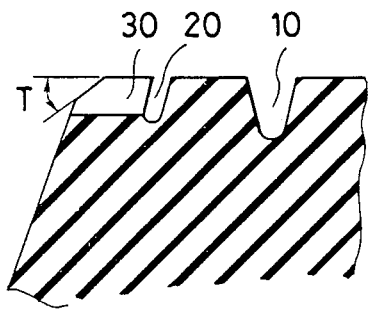
FIG. 6 is a fragmentary cross-sectional view showing the tire having taper shoulders at both the tread ends thereof when viewed in the same cross section as in FIG. 5.

Further, it is also possible to form the tread end in round shoulder shape as shown in FIG. 5, when view in a cross section taken along the lateral direction of the tire. In this case, it is preferable that the radius of curvature R of the round shoulder within a range of 10 to 50 mm. Furthermore, it is also possible to form the tread end in taper shape as shown in FIG. 6. In this case, it is preferable to determined the taper angle T within a range of 30 to 60 degrees.

Figure 7:
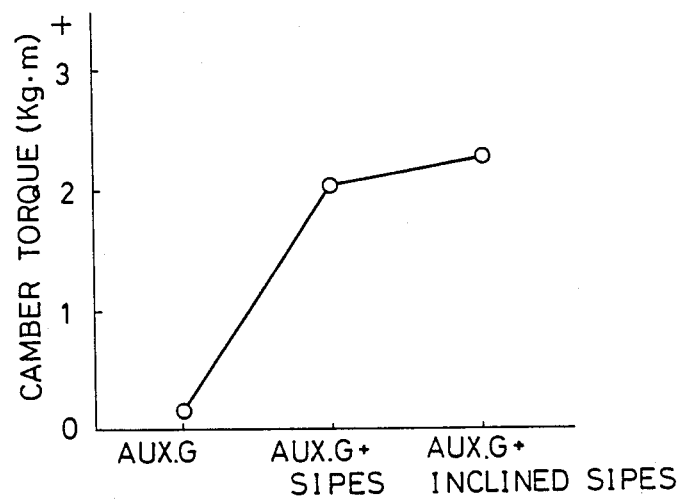
FIG. 7 is a graphical representation showing the relationship between the tread patterns including sipes and the camber torque.

The effect of the sipes upon an increase in the camber torque (kg.m) of the radial tire is shown in FIG. 7. This graph indicates that when the sipes are additionally formed adjoining to the auxiliary grooves 20, the camber torque increases by about 2 kg.m; and further when the formed sipes are inclined toward the direction that the tire is rotating, the camber torque further increases by about 0.5 kg.m.

As described above, in the radial tire according to the present invention, auxiliary grooves 20 extending in the circumferential direction of the tire and being sloped axially outward are arranged and further the rib outside the auxiliary groove 20 is divided by a number of sipes 30 to reduce the rigidity of the outer rib so that the outer rib is readily deformed toward the auxiliary groove. Therefore, it is possible to obtain a high camber thrust. Further, a number of sipes 30 extending substantially in the axial direction of the tire E are arranged at regular intervals along the circumferential direction on the land portion P located outside the auxiliary groove 20 so as to generate a braking force between sipes on the forward (along the tire rotating direction) land portion. Therefore, it is possible to obtain a high camber torque in the direction toward the top of a rut, thus improving the wandering performance markedly.

(Tests)

In order to confirm the effect of the radial tire according to the present invention, the camber thrust, the camber torque, and the self-alignment effort of the tire have been measured and the actual vehicle steering feeling test has been effected.

The specifications of radial tires used for the measurement tests were as follows:

| | | |
|---|---|---|
| 1. | Tire size | LSR 750 R16 14 PR |
| 2. | Main circumferential grooves | 4 grooves |
| 3. | Tire outer diameter | 806 mm |
| 4. | Tread width | 140 mm |
| 5. | Inner pressure | 7.0 kg/cm$^2$ |
| 6. | Load | Normal load |
| 7. | Test vehicle | Medium bus |
| 8. | Test road. | Expressway |

Table 1 below lists the various dimensions or features of the radial tires according to the present invention in comparison with other tires. In Table 1, the prior art 1, 2 and 3 designate prior-art tires not formed with both auxiliary grooves and sipes; however, the tire corner shape is different from each other. The prior art 4 designates a tire formed with only declined auxiliary tires. The examples 1, 2 and 3 designate the radial tires according to the present invention formed with auxiliary grooves having a width $W_a$ of 3 mm, an inclination angle $\theta_a$ of 15 degrees and a position ratio $S_a/S_m$ of 30% and declined sipes. However, only the tire corner shape is different from each other as listed.

The comparisons 1 and 2 designate the radial tires for comparison formed with declined auxiliary grooves and no sipes. However, the tire corner shape is all square in shape. The comparison between Prior Arts 1 to 4 and Examples 1 and 2 will indicate the effect of sipes, while the comparison between Examples 1 to 3 and Comparisons 1 and 2 will indicate the effect of the auxiliary groove.

TABLE 1

| | Shoulder shape | Sipes | Aux. groove width Wa (mm) | Aux. groove angle θa (degree) | Aux. groove position Sa/Sm (%) | Camber trust | Camber torque | Self.A effort |
|---|---|---|---|---|---|---|---|---|
| Example 1 | Square | YES | 3 | 15 | 30 | +25 | +2.0 | 130 |
| Example 2 | Round | YES | 3 | 15 | 30 | +35 | +2.0 | 135 |
| Example 3 | Taper | YES | 3 | 15 | 30 | +35 | +2.0 | 135 |
| Prior Art 1 | Square | NO | — | — | — | −5 | +0.1 | 100 |
| Prior Art 2 | Round | NO | — | — | — | +5 | +0.1 | 105 |
| Prior Art 3 | Taper | NO | — | — | — | +5 | +0.1 | 105 |
| Prior Art 4 | Square | NO | 1.5 | 15 | 30 | +5 | +0.1 | 105 |
| Comparison 1 | Square | NO | 3 | 15 | 30 | +10 | +0.6 | 110 |
| Comparison 2 | Square | YES | 1.5 | 15 | 30 | +20 | +1.5 | 120 |

Table 1 and 2 show the test results. In Table 1, the self-alignment effort is shown by indices obtained when that of the prior art tire 1 is set to 100. The greater the self-alignment effort index is, the better will be the vehicle steering control.

TABLE 2

| | Actual vehicle steering feeling test |
|---|---|
| Prior Art 1 | Traveling is uncontrollable because of difficulty to steer. |
| Prior Art 2 | Traveling is uncontrollable at large rut. |
| Prior Art 3 | " |
| Prior Art 4 | " |
| Example 1 | Traveling is controllable at a large rut. |
| Example 2 | " |
| Example 3 | " |
| Comparison 1 | Traveling is controllable only at a small rut. |
| Comparison 2 | Traveling is controllable only at a small rut. |

Table 1 indicates that the Examples 1, 2 and 3 of the tires according to the present invention are all excellent in the camber thrust, the camber torque and the self-alignment effort as compared with the prior arts 1 to 4 and the comparisons 1 and 2. Further, Table 2 indicates that the Examples 1, 2 and 3 of the tires according to the present invention enable the bus to be travelled or controlled even along a large rut.

As a described above, in the radial tire according to the present invention, since the auxiliary groove extending in the circumference of the tire is formed on the shoulder rib of the tire in such a way that the width $W_a$ of the auxiliary groove is narrower than that $W_m$ of the main groove but wide enough not to bring both the side walls of the auxiliary grooves into the contact with each other; the inclination angle $\theta_a$ of the auxiliary groove with respect to a normal line vertical to the outer surface of the tread lies within a range of 10 to 60 degrees; and the distance $S_a$ of the auxiliary groove lies within a range of 20 to 80% of the distance $S_m$ of the main groove when measured in the lateral direction of the tire from the outermost edge of the tread, it is possible to fairly increase the camber thrust. In addition, since the sipes are arranged on the land portion located outside the auxiliary groove at regular intervals in the circumferential direction of the tire and extending in the lateral direction of the tire from the outermost end of the tire so as to traverse the land portion, it is possible to obtain a large camber torque in the direction that the tire ascends on the slope of a rut. Therefore, in the radial tire according to the present invention, it is possible to markedly increase the wandering performance, as compared with the conventional radial tires for heavy-duty load vehicles, without deteriorating various performances required for the radial tires.

What is claimed is:

1. A pneumatic radial tire for vehicles, which comprises:
    (a) a plurality of main grooves extending in a substantially circumferential direction of the radial tire;
    (b) at least one auxiliary groove disposed on both shoulder ribs of the radial tire and extending in a substantially circumferential direction of the radial tire in such a way that a width of said auxiliary groove is narrower than that of the said main groove but wide enough not to bring both side walls of said auxiliary groove into contact with each other during cruising of the vehicle upon load; an outward inclination angle of said auxiliary groove is in the range of 10 to 60 degrees with respect to a normal line substantially perpendicular to an outer surface of a tire tread; and a position of said auxiliary groove is such that a distance from an outermost edge of the tire tread to the auxiliary groove is in the range of 20 to 80% of a shoulder rib with; and
    (c) a plurality of sipes arranged outside said auxiliary groove disposed on both shoulder ribs at regular intervals along the circumferential direction of the tread and extending substantially in the lateral direction of the tread from the outermost edge of the tread to said auxiliary groove.

2. The pneumatic radial tire as set forth in claim 1, wherein the width of said auxiliary groove is in the range of 1 to 4% of that of said main groove adjacent to said auxiliary groove.

3. The pneumatic radial tire as set forth in claim 1, wherein the depth of said auxiliary groove is in the range of 30 to 120% of that of said main groove adjacent to said auxiliary groove.

4. The pneumatic radial tire as set forth in claim 1, wherein a width of said auxiliary groove is in the range of 2 to 6 mm.

5. The pneumatic radial tire as set forth in claim 1, wherein a wide of said sipes is in the range of 0.3 to 1.5 mm.

6. The pneumatic radial tire as set forth in claim 1, wherein a depth of said sipes is in the range of 30 to 80% of that of said auxiliary groove.

7. The pneumatic radial tire as set forth in claim 1, wherein positional intervals of said sipes are in the range of 3 to 12 mm.

8. The pneumatic radial tire as set forth in claim 1, wherein said sipes are inclined toward a direction that the tire is rotating.

9. The pneumatic radial tire as set forth in claim 8, wherein the inclination angle of said sipes is in the range of 0 to 60 degrees with respect to a radial direction of the tire.

10. The pneumatic radial tire as set forth in claim 1, wherein a corner of the tire is round in shape when viewed in a cross section taken along a lateral direction of the tire.

11. The pneumatic radial tire as set forth in claim 1, wherein a corner of the tire is square in shape when viewed in a cross section take along a lateral direction of the tire.

12. The pneumatic radial tire as set forth in claim 1, wherein a corner of the tire is tapered in shape when viewed in a cross section take along a lateral direction of the tire.

13. The pneumatic radial tire as set forth in claim 10, wherein a radius of curvature of the round corner is in the range of 10 to 50 mm.

14. The pneumatic radial tire as set forth in claim 12, wherein an angle of the tapered corner is in the range of 30 to 60 degrees with respect to the outer surface of the tire tread.

15. The pneumatic radial tire as set forth in claim 1, said sipes are formed in such a way that bottom ends thereof extend toward a direction that the tire is rotating at an inclination angle $\theta_s$ with respect to a tire radial direction $N_R$.

* * * * *